INVENTOR.
Richard E. Moore
BY
his ATTORNEYS

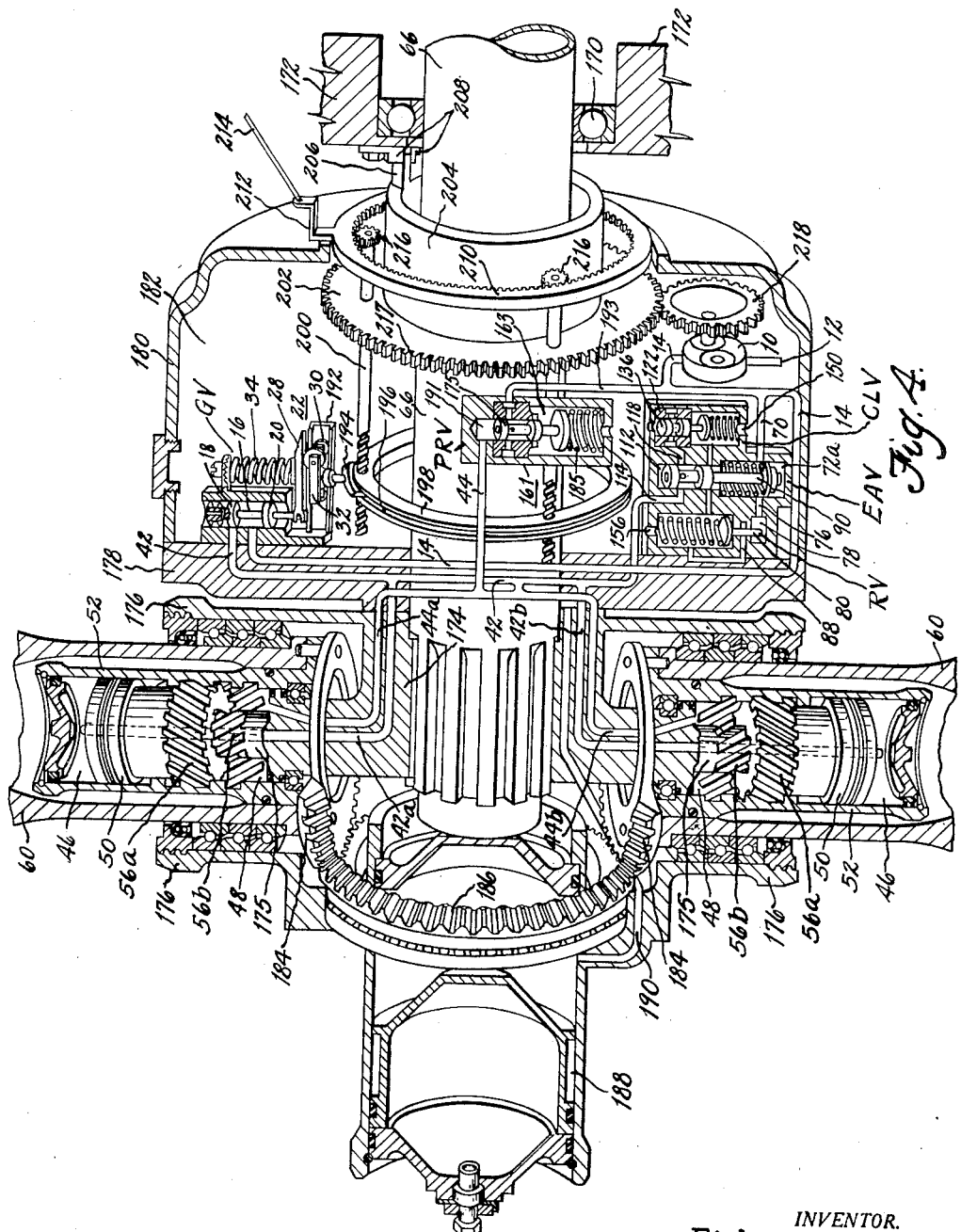

Patented Aug. 11, 1953

2,648,389

UNITED STATES PATENT OFFICE 2,648,389

VARIABLE PRESSURE SYSTEM

Richard E. Moore, Dayton, Ohio, assignor to General Motors Corporation, Detroit, Mich., a corporation of Delaware Application June 14, 1947, Serial No. 754,689

14 Claims. (Cl. 170—160.21)

This invention relates to the control of variable pitch propellers, particularly those involving fluid pressure mechanism for shifting the blade pitch to accomplish desired ends.

One of the objects of the invention is to reduce the amount of off-speed of a governing system by increasing the proportionalizing rate of a control valve.

Another object of the invention is to provide a propeller control by which the propeller speeds are caused to follow closely and quickly, acceleration and deceleration of the driving force.

Another object of the invention is to maintain the source pressure at a fixed amount above the pressure necessitated for operating one of the pitch control functions.

A further object of the invention is to provide a fluid pressure system of the variable pressure type that will maintain a constant rate of decrease pitch change for flow-sensitive systems.

A further object of the invention is to provide a fluid pressure system that will maintain desirable rates of pitch change though subjected to extreme demands of flow for effecting a pitch change function.

A further object of the invention is to provide a fluid pressure system of the variable pressure type having a pressure relief that will maintain a consistent rate of pitch change for flow sensitive systems.

A further object is to provide a fluid pressure system and control apparatus therefor that will maintain the required pressure against the ever present blade load tending to shift to a predetermined position.

Still another object of the invention is to provide a governor controlled fluid pressure system of high potential, in which the governor becomes a true flow governor and only throttles pressure fluid through one port during normal operation, thereby removing all reversing flow forces from the governor valve, and maintaining a constant pressure drop across the governor. Another object of the invention is to improve the system disclosed in my copending application Ser. No. 718,071, now U. S. Patent Serial No. 2,536,138, issued January 2, 1951, by providing a governing system in which pressure fluid is throttled through but one port for all conditions of operation.

Yet another object of the invention is to provide a fluid pressure system for the control of variable pitch propellers, which system will have maximum pressure sensitivity as well as produce an ideal constant pressure differential between source pressure and increase pitch port pressure.

Among other objects of the invention is to provide a fluid pressure system of control for variable pitch propellers whose blades have high centrifugal twisting moments tending to decrease pitch, and in which the centrifugal twisting moment varies as the square of the rotational speed and which may become critical at very low rotational speeds of operation.

The indicated objects and advantages are accomplished by providing a pressure control unit of three element structure that incorporates an equal area valve operating in the nature of a pressure control valve which is constantly connected with a pump source and operates to meter flow through the increased pitch port of the governor valve and apply the pressure potential of that port to a constant-leak valve as a second element of the unit, and which operates to maintain a constant pressure differential between the increased pitch port of the governor and a pressure source. The third element of the unit is a relief valve constantly exposed to the source pressure for safe-guarding the system. A pressure reducer valve interposed in the decrease pitch line maintains a constant decrease pitch pressure by tapping into the line of pressure source instead of metered application through a governor port, while offering no restriction of the drain from the torque unit upon increase pitch change. With the governor valve so organized as to maintain a predetermined amount of negative overlap at the increased pitch port, then a predetermined flow of hydraulic fluid is delivered to one side of the blade torque unit and to the exit orifice of the constant-leak valve. In normal, or on speed operation, the quantative factor of leak and the pressure urge on the one side of the blade torque motor balances the centrifugal moment of rotative force on the blade tending to decrease the blade pitch, by means of which, for normal on-speed operation, the pitch of the blade is held substantially fixed for operation at the speeds selected by the governor valve.

Further objects and advantages of the present invention will be apparent from the following description, reference being had to the accompanying drawings wherein a preferred embodiment of the present invention is clearly shown.

In the drawings:

Fig. 4 is a schematic view of a propeller mechanism in section showing the general distribution of the control elements and circuit of the variable pressure system.

Figures 1, 2, 3:
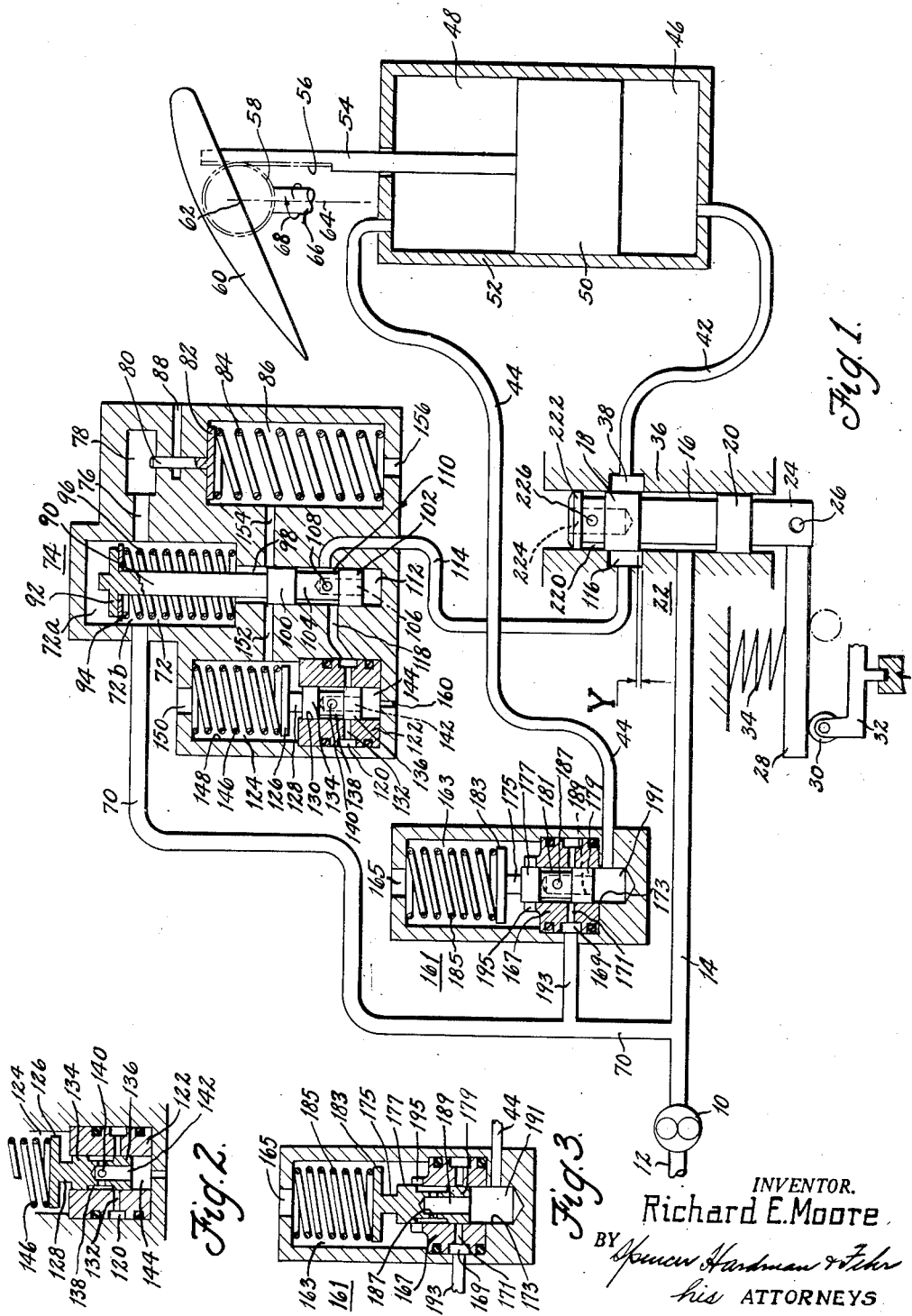
Fig. 1 is a schematic view of the fluid circuit for the improved variable pressure system.
Fig. 2 is a detailed view with parts in section showing the constant leak valve.
Fig. 3 is a detailed view with parts in section showing the pressure reducing valve.

With particular reference to Fig. 1 of the drawings, which shows schematically the hydraulic circuit, 10 is a pump or pressure developing means drawing hydraulic fluid from a reservoir thru an intake 12 and feeds it to a pressure delivery line 14, leading to the waist 16 between lands 18 and 20 of a governor valve 22. The governor valve incorporates a stem extension 24 of the waist 16 that pivotally connects at 26 to a lever 28 resting on a movable fulcrum 30 secured to a carriage 32, the latter being manually adjustable as will presently appear for selecting a speed at which the governor valve is to control. The governor valve unit 22 is situated for response to centrifugal force acting toward the top of the sheet of drawing as shown in Fig. 1 and tending to compress a spring 34 which holds the lever 28 against the fulcrum 30, the valve plunger thereby being capable of sliding movement in a sleeve 36 providing an increased pitch port 38 adapted to cooperate with the land 18 of the valve plunger. From the control port 38 a tubular passage 42 leads to a chamber 46 on one side of a piston element 50 contained within a cylinder 52 constituting a blade torque unit for adjusting with a stem 54 having a toothed rack 56 engageable with a spur 58 affixed to the root of the blade 60 so as to rotate the blade in either direction about its pitch shifting axis 62. Considering that the propeller rotates upon an axis 64 by a shaft 66 in the direction of the arrow 68, then movement of the piston 50 toward the top of the view of Fig. 1 will so actuate the blade by rotating it around its pitch axis 62 as to increase its angle of attack upon the air stream, thus increasing the blade pitch.

A branch line 70 leading from the pump pressure line 14 opens into a chamber 72 forming a damping chamber 72a and pressure regulating chamber 72b for an equal-area valve 74, a secondary connection 76 opening from the chamber 72 into a pocket 78 into which extends a piston 80 having a flat head 82 engaged by a spring 84 contained within a chamber 86. The piston 80 is always subject to the pump pressure within the pocket 78 and is urged to the extended position illustrated by the spring 84 but is subject to depression by the pressure within pocket 78 until flow is established to the drain slot 88 which will relieve an excess of pressure that may occur in the pressure lines 70 and 14.

The equal area valve comprises a stem 90 having a head 92 substantially less in diameter than the bore of the chamber 72 and which is engaged by a damping washer 94 adjacent the underside of the head 92 where it is maintained by a spring 96 engaging the bottom of the chamber 72 adjacent a small bore 98 which houses a valving portion of the stem 90 and from which laterally extends fluid passages as will presently appear. The stem is provided with a valving land 100 and a valve and guide land 102 separated by a waist portion 104 and all contained within the bore 98. An axial bore 106 extending from the lower end of the stem 90 upwardly intersects one or more cross bores 108 that open thru the waist portion 104 of the valve so as to establish communication between an annular groove 110 about the stem between the lands 100, 102, and a pressure chamber 112 at the bottom of the bore 98. Communicating with the annular groove 110 there is a passage 114 that leads to a groove 116 always communicating with the increased pitch port 38 of the governor valve 22. A second passage 118 communicating with the annular groove 110 opens into a channel 120 in the porting sleeve 122 of a constant leak valve the flow through the passage 118 being controlled by the land 102. The porting sleeve 122 is disposed within a chamber 124 housing a plunger 126 having a landed stem 128 contained within a bore 130 of the sleeve 122, the bore 130 having cross passages 132 connecting it with the annular groove 120. Thus, it will be observed that the potential of pressure occurring at the increased pitch port 38 will always be applied through the conduit 114 to the annular groove 110, and the pressure chamber 112, and under certain conditions to the cross passage 118 and the annular groove 120. The stem 128 provides a guide land 134 spaced from a valving land 136 separated by a waist portion 138 which is characterized like the spaced lands of the equal-area valve to connect the annular groove about the waist 138 with the lower end of the valving land through a port 140 and axial bore 142 shown in sectional detail in Fig. 2. The valve stem 128 with its land 136 cooperates with cross passages 132 to regulate the amount of hydraulic fluid moving from the passage 118 to the chamber 144 at the lower end of the stem 128, increase of pressure in the chamber 144 tending to raise the stem such that the land 136 cuts off the flow thru the ports 132, and being resisted by a spring 146 contained within an exhaust chamber 148 at one end of the chamber 124. The exhaust chamber 148 is ported to the outside of the valve unit at 150 and has a cross passage 152 extending from the chamber 148 and opening into the bore 98 of the equal-area valve in the region of one end of the valving land 100 of the stem 90, an extension passage 154 leading from the bore 98 into the exhaust chamber 86 of the relief valve which has a port of exit 156. It will be observed that the passages 152 and 154 constitute drain passages for the equal-area valve and are controlled by the valving land 100 of the stem 90 which controls communication of these passages with the pump line pressure thru the bore 98 opening into the chamber 72.

Briefly, variation of pressure at the increased pitch port 38 and groove 116 of the governor 22 is applied to the conduit 114 and to the annular groove 110 and thence thru the opening 108 and axial bore 106 to the pressure chamber 112. A rise or fall of pressure in 112 tends to raise or lower the valve stem 90 for changing the openings of the passages 152 and 154. If the pressure in chamber 112, increases then the force applied to the valve stem 90 will assist the spring 96 and the centrifugal force of propeller rotation in covering the orifices into the passages 152 and 154 by the land 100. If the pressure in chamber 112, decreases, the assistance to centrifugal force and spring force upon the valve stem is removed and the pressure in chamber 72b on the annular surface of land 100 dominates and to lower the valve member 90 for opening the drain ports 152 and 154. Under those conditions the equal area valve will blow off to lower the pressure in chamber 72. When those ports or passages are closed to pressure within the chamber 72 the potential within pump lines 70 and 14 builds up and may be so great, if no regulation is provided, as to cause a blow off of the relief valve thru the port 88. That blow off is partially prevented by the potential of pump line pressure thru the passage 70 and chamber 72 and bore 98 to the annular end surface of the valving land 100, which annular surface or fractional area is situated between the bore 98 and the stem 90 of the valve. The spring engagement with the head 92 of the valve is such as to provide controlled damping movement of the equal-area valve 74. The spring 96 engages the damping washer 94 which in turn engages the head or flange 92 in a loose manner, that is to say, it is only in contact therewith but is guided by the bore of the chamber 72 while the circular opening is of larger diameter than the diameter of the stem 90 that passes thru it. Thus, downward movement of the valve as illustrated in Fig. 1 is considerably more damped than is the upward movement because movements tending to compress the spring 96 keep the washer 94 in close engagement with the flange 92, whereas upward movement of the equal-area valve may tend to separate the washer 94 from the flange 92, permitting a quick or more rapid relief of the hydraulic fluid trapped in the damping chamber 72a.

A further variation in the upward movement of the equal area valve 90 is accomplished thru the action of the constant-leak valve 126. As heretofore stated, the pressure potential occurring at the increased pitch port 38 may be present in the annular passage 120 and cross passages 132 and is there controlled by the valving effect of the land 136 which admits that pressure potential thru the passages 140 and 142 to the pressure chamber 144. Thus, if the pressure in 144 is increased, the land 136 will be raised to close the ports 132 which stops upward movement of the stem 128. A carefully dimensioned bleed orifice 160 provides a constant leak thru the lines mentioned extending from the increased pitch port 38. Except for conditions hereinafter stated, there will be a continual flow of hydraulic fluid from the pressure line 14 thru the increased pitch port 38, 116, line 114 and waist of the equal-area valve and constant-leak valve to exit at the port 160. Since the waist of the equal area valve, that is, the annular channel 110, is always connected to the pressure chamber 112, the assisting effect applied to the spring 96 will be under the control of the constant-leak port 160.

The relation of the passages 152, 154, and 118 are disposed in such relation to the land 100 and 102 of the stem 90, that there exists at least a slight metering of the flow into the passage 118 by the time that the drain through the passages 152 and 154 is completely cut off. When the orifice from the bore 98 into the passage 118 is less in area than that of the bleed orifice 160 then the rate of bleed is diminished and the pressure in chamber 144 drops because of the lessened flow of fluid thereto. However that produces no substantial change in the pressure line over what is wrought by the diminished flow through 118. That restriction, of course, occurs only when there is a considerable and sudden drop in pressure potential within the line 70 that effects closing of the blow off ports 152 and 154. The line experiencing a sudden fall in pressure potential, the branch from the increase pressure port 38 to the constant-leak device is temporarily restricted or perhaps entirely closed off to afford a more rapid recovering of the working potential in the pressure line. Sudden build-up of pressure following those conditions is amply guarded against by the relief valve 80 and the pressure control or equal-area valve which opens the orifice to 118 just as soon as the pressure in the line 70 will accommodate the flow or leak from port 160 and yet supply the system for governed operation.

From the foregoing it will be apparent that the fluid pressure potential applied to the torque unit chamber for increasing the pitch is always governed high pressure whose potential is controlled by the provision of a constant leak of controlled magnitude by means of a pressure controlling assembly taking into account excessive demands of fluid flow from a bounteous source of supply. The volume of fluid delivered by the pump 10 is designed to be quite in excess of that needed for governed pitch operation and to supply the constant leak through port 160, and yet have available a sufficient supply of fluid flow to effect feathering and reverse pitch shift if called for. That provides for a constant pressure application in the chamber 46 of the torque motor through the off-set valving relation at port 38, while the reverse side of the piston 50 is constantly subjected to an opposing pressure of reduced potential accomplished by a pressure reducing valve 161 inserted between the decreased pitch line 44, and the branch line 70 always communicating with the pump 10. The pressure reducing valve 161 provides a chamber 163 with an outside opening 165 and which houses a porting sleeve 167 channeled at 169 to communicate by bores 171 with an axial bore 173 slidably engaging a spool member 175 having lands 177 and 179 on opposite sides of a channel 181. A head member 183 of the spool member is engaged by a spring 185 within the chamber 163 for holding the valve in depressed relation so that channel 181 will normally communicate with the bores 171, and by holes 187 and countersink 189 connect them with an end passage or chamber 191 to which the decrease pitch line 44 is connected. The channel 169 of the porting sleeve is connected by passage 193 to the pressure branch 70 such that the pressure therein may penetrate through passage 193, channel 169, bores 171, channel 181, holes 187 and countersink 189 to chamber 191 and thence by line 44 to the decrease pitch side of the torque unit. However, the full force of the potential in line 70 is not subjected to the chamber 48 of the torque unit, because of the action of the pressure reducing valve 161.

The potential of pressure in the line or branch 70 when applied to the channel 181 of the spool member 175 has no effect because of the equal area of the annular faces at the junctures of the lands 177 and 179, but since the channel 181 is connected by the holes 187 and countersink 189 with the end face of the land 179, the spool member 175 is thereby raised upward against the tension of spring 185 until the bores 171 are so far covered by the edge of land 179 that a reduced flow and consequently a reduced pressure obtains in the chamber 191. That reduced pressure is depended upon to restrain the blades from shifting to decrease pitch when the governor 22 is controlling for "on speed," or is in the equilibrium position.

During governor action calling for increase pitch the port 38 is more widely opened to admit the increased flow to chamber 46 and at the same time to channel 110 of the equal area valve 74 which latter manifests in raising of the plunger 90 and cut-off of the blow-off ports 152, 154 so that the pressure in line 14 and 70 is raised as needed and applied to the chamber 46 for moving the piston 50. Movement of the piston effects drain of the chamber 48 through the line 44 to the chamber 191 of the pressure reducing valve 161, where the spool member 175 is raised against the spring 185 to cut off the bores 171 and open the notches 195 in the castellation of the porting sleeve 167 surrounding the land 177 substantially as shown in Fig. 3. The drain from the chamber 48 is thus effected through the countersink 189 from the chamber 191 to the holes 187, channel 181, notches 195 of the castellation, chamber 163 and opening 165. The pressure reducing valve 161 therefore acts in a dual capacity to provide a relief valve for the decrease pitch line or chamber 48.

In governed action calling for decrease pitch the port 38 is not only closed off from pressure application but the channel 220 is connected with the port 38 so that the drain connections are set up for the chamber 46. Pressure is immediately reduced in connections 42 and 114, the latter of which leads to the chamber 112 of the equal area valve, which now having no assistance for the spring and centrifugal force normally acting on it to close off the blow-off ports 152 and 154, suddenly retracts so as to relieve the pressure in branch 70 through the ports 152, 154, chambers 86, 148, and ports 150, 156. The diminution of pressure in branch 70 is not enough to deplete the power source for moving the piston of the torque unit. Directly that the drain starts from chamber 46, the piston 50 moves downwardly from the pressure application in chamber 48 with a sufficient reduction of pressure therein and in the chamber 191 to allow retraction of the spool member 175 with wider opening of the bores 171 leading to the branch 70. Any flow of fluid from branch 70 immediately reflects in a new position of the equal area valve 74 to maintain the potential of the line, so that there is, on call for a decrease pitch change, a continual and satisfactory reduced pressure application to the torque unit to effect the pitch change called for.

Applying the same principles exhibited in the schematic diagram of Fig. 1, provides the sectional pictorial view of Fig. 4 where the elements shown in Fig. 1 have been distributed around the propeller shaft 66, supported by the bearings 170, carried by an engine nosing or gear casing 172, and from which the shaft rotatably extends to drivingly support a propeller hub 174, providing sockets 176, journalling the blades 60 for pitch shiftable movement about their longer axes, and for revolution about the axis of the shaft 66. Rotatable with the shaft and hub there is a regulator comprising an annular plate 178 and a cover member 180 that cooperates to provide a reservoir 182 housing the control apparatus of Fig. 1, and here designated as the governor valve GV, a relief valve RV, and equal area valve EAV, the constant leak valve CLV, the pressure reducing valve PRV, and a pump or pressure creating device 10. These elements are so mounted upon the regulator plate 178 as to properly take advantage of centrifugal force of rotation when considering that the regulator supporting and enclosing these elements is rotated about the propeller shaft 66 as an axis. Fluid passages extend from the pump to the various element of the control apparatus in accordance with the principles expressed with respect to Fig. 1, the pitch increase line 42 and the pitch decrease line 44 each having branches 42a and b and 44a and b respectively leading to the appropriate chambers 46 and 48 of the two blades here shown. Instead of the rack or gear connection between the piston and blade as shown in Fig. 1, the piston 50 of Fig. 4 has splined engagement at 56a with the cylinder 52, and at 56b with a spindle 175 of the hub 174. Lineal movement of piston 50 rotates the blades 60 in its socket relative to the spindle 175 by reason of the double helical splines 56a and 56b. Each of the blades is provided with a blade gear 184 that each mesh with a master gear 186 adapted to keep the blades in track and insure that as one blade changes in pitch the other will also change in pitch an equal amount. Also included in Fig. 4 there is an accumulator 188 disposed axially of the hub 174 and providing a pressure line 190 adapted to connect into the system for use in connection with feathering and unfeathering of the propeller blade, where that function is desired. However, since the feathering function plays no particular part in the novel control of pitch that is herein described, it is not deemed necessary to enter into the description of blade feathering.

The control apparatus embodied within the regulator 180 is always under control of the pilot insofar as the governor valve GV may be set at any time to establish a speed level at which the automatic mechanism is to control. It has been stated earlier, that the fulcrum roller 30 is mounted on a movable carriage 32 for selecting a speed at which the governor valve will control and that is accomplished in Fig. 4 by supporting the carriage 32 between a pair of guide ways 192 with an extension or shoe 194 of the carriage engaging a groove 196 of a control ring 198. The control ring encircles the shaft 66 and is slidable longitudinally thereof by means of high-lead control shafts 200 threaded into the ring 198 and journaled in a flange 202 of a sleeve 204 maintained against rotation with the propeller, by means of a lug 206 engaging between brackets or clips 208 secured to the engine nosing 172. A ring gear 210 is provided with a lever 212, and a control cable or rod 214 outside of the cover 180, engages pinions 216 fixed to the ends of the control shaft 200, so that oscillation of the lever 212 rotates the screw shaft 200 and causes axial movement of the control ring 198 within the regulator. The flange 202 is prepared with a toothed periphery 217 to engage a pinion 218 that drives the pump 10. When the propeller is in operation, it will be observed that the control ring 198, the screw shafts 200, the sleeve 204 with its attached spur gear 217 are all non-rotative because of the interengagement provided by 206 and 208, which means that the propeller with the regulator containing the control apparatus rotates outside of this group of elements, known as an adapter assembly. The pump gear 218 rolling over the spur 217 effects development of pressure by the pump 10 within the lines 14 and 70 of the system which pressure is regulated by the three element pressure control valve and delivered to the governor valve. The speed of propeller rotation will be determined by the position of the fulcrum roller 30 along the length of the lever 28, since that position determines at what speed of rotation centrifugal force acting upon the governor valve plunger thru the lever arm between the point 26 and engagement with the roller 30 will just balance the force of the spring 34 applied to the lever 28 thru the length of the arm between the point of spring pressure and point of fulcrum engagement. The relation of these working arms may be altered by actuating the arm 212 of the ring gear which in turn effects the shifting of the control ring 198 and consequently moves the carriage 32 along the ways 192 substantially as shown and described in the patents to Blanchard et al. 2,307,101 and 2,307,102.

During on-speed operation, the land 18 of the governor valve will so cooperate with the port 38 as to result in equal forces being applied to both sides of the piston 50 of the blade motor 52, as a consequence of which there will be no blade shift movement. In the present instance, because of the natural tendencies of the blade while in operation to seek a decreased pitch position, the particular coincidence of governor lands and ports during on-speed will involve a slight amount of predetermined offset as designated at Y in Fig. 1. That particular predetermined offset takes into account the tendency of the blade to move to decreased pitch position, and permits an exactly balancing force of hydraulic pressure to be applied to the chamber 46 of the blade motor for opposing the built in tendency of decreased pitch shift. The off-set also maintains a continual flow from the pressure line 14 thru the passage 114 and has been described to exit at the constant leak orifice 160. Upon the occurrence of increase in speed the governor valve moves outwardly, upward as shown in Fig. 1, which increases the opening of the increased pitch port and allows sufficient pressure application to the passage 42 and the chamber 46 to move the piston 50 for increasing the pitch of the blade 60 for effecting the increase in the load placed upon the motor and consequently reflecting in a decrease of speed, in the meanwhile the chamber 48 draining thru the passages 44 the pressure relief valve chamber 163 to return to the reservoir. Upon the occurrence of decrease in propeller speed, less centrifugal force is applied to the governor valve by reason of which the spring 34 moves the governor valve plunger inwardly, first, such as to completely cover the increased pitch port 38, or so as to absorb the off-set Y. That shift in itself so disturbs the balance of forces applied to the chambers 46 and 48 as to allow blade 60 to shift toward the decreased pitch position against the removal of pressure application that has been theretofore exerted in 46. If that release of opposing pressure thru the passage 42 that is afforded by means of the constant leak orifice 160 is insufficient to provide enough correction, then further inward movement of the governor valve plunger opens the increase pitch port 38 to drain. In order to restrict the rapidity of drain from the chamber 46, the governor valve provides an annular groove 220 between the land 18 and a third land 222 adjacent the increased pitch port 38. An axial bore 224 and a cross port 226 opens the channel to the outer end of the governor valve, such that when the increased pitch port 38 is exposed to drain, flow therefrom is restricted to that of a quantity that will prevent hunting or speed variation from the adjusted speed level. Thus, in draining from the chamber 46 thru the port 38 the hydraulic fluid must pass thru the restricted port 226 and thence thru the axial bore 224, all as is more amply described and claimed in the copending application filed by me on October 8, 1945, as Ser. No. 621,004.

The operation of the disclosed system as effected by the three element pressure control valve and the pressure relief valve is as follows: the constant-leak valve CLV maintains a constant leak from the increased pitch port 38 as long as the line is open to the valve with a pressure of as much as 200 lbs. p. s. i. This leak is produced by the valve maintaining a constant pressure of 200 p. s. i. against the orifice 160. In the preferred embodiment the amount of flow through this orifice at 200 p. s. i. is approximately 60 cubic inches per minute, which in the said preferred embodiment is equivalent to about 1° per second rate of pitch change. The equal-area valve EAV maintains the approximate position shown in the sketch during normal operation, or during the equilibrium position as it is sometimes referred to, and controls the pump operating pressure, maintaining it at a fixed amount above the pressure at the increase pitch port 38. The equal area valve closes only when the governor valve GV is wide open at the control port calling for the full available rate of pitch change, which happens only in extreme cases, such as during feathering and braking operations. When the equal-area valve EAV closes, the line from the increase pitch port 38 to the leak valve CLV is shut off at 118, from which it will appear that the leak valve CLV does not interfere with the maximum rate of pitch change and flow-sensitive feathering systems. The pressure relief valve RV limits the system pressure and operates only in extreme cases where the equal-area valve EAV may be overdamped. The amount of offset of control land and port designated at Y in Fig. 1, is large enough to supply the constant leak and maintain the required pressure against the ever present blade load tending to decrease pitch. If an overspeed occurs, the distance Y increases supplying more flow which increases the blade angle. If an underspeed occurs, the distance Y decreases reducing the supply to the leak valve CLV which decreases the blade angle. Since the leak valve CLV is producing a constant leak the blade angle decreases at the rate of the difference in the constant leak and the amount of flow being supplied thru the governor GV.

The governor valve GV now becomes a true flow governor. The approximate 1° per second rate of decreased pitch is adequate to take care of normal operation in the described embodiment which includes the usual maneuvers within the operating range of the pursuit plane. The governor GV only throttles oil thru the increase pitch port 38 during normal operation. All reversing flow forces are removed from the governor valve and the constant pressure difference from the pump line 14 to the increase pitch line 42 is controlled by the load of the spring 96 in the equal-area valve EAV, which can be kept to a reasonable amount for controlling the one flow force now left in the governor GV during normal operation. Since the equal-area valve EAV maintains a constant pressure drop across the governor the most ideal porting for a given installation can be obtained. The equal-area valve EAV gives the system maximum pressure sensitivity as well as produces the ideal constant pressure difference between pump 10 and increased pitch line 42. High pressure sensitivity is needed because of the friction effect of the blade motor unit 50, 52.

While the embodiment of the present invention as herein disclosed, constitutes a preferred form, it is to be understood that other forms might be adopted, all coming within the scope of the claims which follow.

What is claimed is as follows:

1. A fluid pressure system including a fluid motor working against widely varying opposing forces, a fluid pressure source, a governor valve with a flow port connected to one side of said fluid motor, and automatically operable to distribute pressure fluid from said source to the fluid motor for operating the fluid motor in one direction, said port when the fluid motor is inactive being open to source pressure by a predetermined amount, means including a pressure reducing valve connecting said pressure source to the other side of said fluid motor tending to operate said motor in the opposite direction, pressure control means including a leak orifice, and a valve for controlling the flow of fluid from the orifice to match the flow from said governor port, said orifice control valve having an area exposed to the source pressure tending to move the valve in a pressure reducing direction, an equal area exposed to the pressure at the governor flow port tending to move the valve in a pressure increasing direction, spring means assisting the valve movement toward pressure increase, a flow control valve opening to said leak orifice and having a passage controlled by said orifice control valve, pressure increasing movement of said orifice control valve tending to close the passage to the flow control valve, and operating upon wider governor port opening to increase the source pressure commensurate with the demands of the force to be opposed by said fluid motor.

2. A fluid pressure system including a fluid motor working against widely varying opposing forces, a fluid pressure source, a governor valve with a flow port connected to one side of said fluid motor, and automatically operable to distribute pressure fluid from said source to the fluid motor for holding the fluid motor inactive and for operating the fluid motor in one direction, means applying reduced source pressure to the other side of said fluid motor, said governor flow port when the fluid motor is inactive being open to source pressure by a predetermined amount, pressure control means including a leak orifice, and a valve for controlling the flow of fluid from the orifice to match the flow from said governor flow port, said orifice control valve having one area exposed to the source pressure for moving the valve in a pressure decreasing direction, an opposed equal area exposed to the pressure at the governor flow port for moving the valve in a pressure increasing direction, a port and passage leading to said leak orifice and controlled by said valve movement, a flow control valve in the passage to said orifice responding to the flow through the associated port of the orifice control valve for effecting a substantially constant leak from said orifice, said orifice control valve operating upon decrease of governor port opening to increase the fluid flow to said leak orifice.

3. In a fluid pressure system for actuating a fluid pressure motor to adjust the pitch of blades on aircraft propellers, through a wide range of angles, comprising in combination, a source of fluid pressure for application to said fluid pressure motor, a flow governor connected to said source of fluid pressure for directing pressure fluid from said source to one side of the fluid pressure motor for holding the motor inactive and for actuating the motor in opposite directions, said governor having a port connected to one side of said motor, and which port is partially open upon inactive status of said motor, valve means having opposed equal piston areas exposed to source pressure and to the pressure at the said governor port, for maintaining a constant pressure drop across the said governor port, means including a definite orifice and a pressure responsive valve providing a selectively operable constant leak of predetermined magnitude from said governor port, and subject to the control of said first mentioned valve, passage means supplying fluid to said orifice and said pressure responsive valve from said first-mentioned valve and valve means providing diminished source pressure on the opposite side of said motor for opposing the governor directed pressure.

4. In a fluid pressure system for actuating a fluid pressure motor to adjust the pitch of blades on aircraft propellers, through a wide range of angles, comprising in combination, a source of fluid pressure for application to said fluid pressure motor, a flow governor connected to the source of fluid pressure for directing pressure fluid from said source to one side of the fluid pressure motor for holding the motor inactive against the ever present tendency to move to decrease pitch, and for actuating the motor in one direction for increasing the pitch of the blades, said flow governor having a control port connected with one side of said motor, a pressure reducing valve connecting the other side of said motor with the said source of fluid pressure, a pressure control unit for controlling the potential of pressure applied to said one side of the motor and including a spring-biased valve for controlling the potential of pressure source as needed at said governor control port, opposite surfaces of said valve being exposed to the source pressure and to the pressure at the control port of said governor for maintaining the pressure of said source, a leak orifice and a controlling valve therefor operatively associated with said pressure control valve maintaining a selectively operable constant leak from the control port of the governor, flow of pressure fluid to the said control valve being under the control of the said pressure control valve, and a relief valve connected at all times to the potential of the source pressure for limiting the potential thereof to a safe value.

5. In a fluid pressure system for actuating a fluid pressure reversible motor subject to a widely variable load applied continuously to one side of the motor, the combination comprising, a source of fluid pressure, a flow governor connected with the source and having a single flow port connected with said motor to oppose the variable load, means connected with said source pressure providing a constant reduced pressure applied to the motor in aiding relation to the variable load, and means controlling the pressure applied through the flow port of said governor to hold the motor inactive by a balance of forces on opposite sides thereof, or to actuate said motor in either load aiding relation or load opposing relation, said controlling means including a partial opening of said flow port admitting source pressure to the load opposing side of said motor, a variable pressure control valve controlling the source pressure applied through said flow port, said valve having an area constantly exposed to said source pressure and an equal opposed area constantly exposed to the said flow port whereby a predetermined pressure drop is maintained across said flow port, and a constant leak device controlled by the opposing pressures on the pressure control valve for equalizing the source pressure applied by the flow port to the motor with the combined effects of the load and constant reduced pressure applied to the other side of the motor for retaining the motor in an inactive position.

6. The combination set forth in claim 5, wherein increased opening of the governor flow port for actuating the motor in load opposing relation operates to increase the source pressure without changing the amount of leak from the system and without altering the constant reduced pressure applied to the motor in aiding relation to the load on the motor, said leak device including an orifice and flow control valve connected with the pressure control valve and establishes a constant leak from the system equal to the constant pressure at the governor flow port.

7. In a fluid pressure system for advancing, retarding and holding a reversible piston motor against an ever present and widely varying load, comprising in combination, a source of fluid pressure, a governor valve connected with said source and having a single flow port for directing pressure fluid from said source to the advancing side of said motor, means including a pressure reducing valve for applying fluid pressure of relative low potential to the retarding side of said motor, means regulating the source pressure applied to the advancing side of said motor and to said pressure reducing valve and including a valve having opposed equal areas, one of which is exposed continuously to the source pressure and the other area of which is continuously exposed to the pressure at said governor flow port, means including a port controlled by the valve having equal opposed areas providing a constant leak from the system, and means including a predetermined opening of the flow port for balancing the governed high pressure applied to the advancing side of the motor against the aggregate of variable load and reduced pressure applied to the retarding side of the motor, such that the motor may be held inactive, normal operation of the governor valve in opposing varying loads effecting a change in opening of the said flow port with a resultant change in governed pressure by the valve of equal areas without change of the constant leak from the system or change of reduced pressure applied by the pressure reducing valve.

8. The combination set forth in claim 7, wherein said pressure reducing valve provides a port for drain of the retarding side of the motor when the flow port of the governor applies governed high pressure to the advancing side of the motor in excess of the aggregate reduced pressure and variable load applied to the retarding side of the motor.

9. The combination set forth in claim 7, wherein said governor valve provides a restricted outlet open to said flow port for drain of the advance side of the motor when the governor valve cuts off application of governed high pressure to the motor, and the aggregate of varying load and reduced pressure applied to the retarding side of the motor dominates.

10. A fluid pressure system including a fluid motor working against opposing forces of widely varying magnitude, a fluid pressure source, a distributor valve automatically operable to distribute pressure fluid from the source to one side of the fluid motor for just balancing the opposing forces on the motor, and a pressure control means operatively connected to the pressure source and to the fluid motor for maintaining a definite pressure differential between the pressure source and the pressure distributed to one side of the fluid motor, said pressure control means including a constant leak orifice variably connectible to the distributed pressure, a pressure control valve having equal opposed areas one subject to the pressure source and the other subject to the pressure distributed to said one side of the fluid motor, said leak orifice being controlled by a valve open at all times to the pressure distributed to said one side of the fluid motor, said orifice control valve being responsive to a predetermined pressure rise in the motor to stop all flow through said orifice, and a valve unit for reducing the pressure applied to the other side of said fluid motor.

11. A fluid pressure system including, a fluid motor having a movable member subject to an external force tending to move the member in one direction, a source of fluid pressure, a pressure reducing valve connected to said source and said motor for applying fluid under reduced pressure to one side of the motor member in assisting relation to said external force, a control valve automatically operable to apply pressure fluid from said source to the other side of the motor member in opposing relation to said external force for just balancing the combined effects of said external force and reduced fluid pressure while the motor is inactive, and pressure control means operatively connected with said source and said other side of the motor member for maintaining a definite pressure differential between the source of fluid pressure and the pressure of the fluid applied to said other side of the motor member, said pressure control means including a constant leak orifice connected to the pressure fluid applied to said other side of the motor member and operable only when pressure fluid is applied to said other side to maintain a continual flow of fluid to drain, and a pressure control valve having equal areas subject to the pressure of said source and the pressure of the fluid applied to said other side of the member for controlling the flow from said leak orifice.

12. The combination set forth in claim 11 wherein the pressure control valve controls a drain port from the pressure source by reason of resilient mechanism tending to close said drain port, said area of the valve exposed to source pressure opposing the resilient mechanism tending to close said drain port, and said area exposed to the pressure applied to said other side of the motor member assisting the resilient mechanism tending to close the drain port.

13. The combination set forth in claim 11 wherein the control valve includes a land, a port connected with the other side of said motor member and cooperating with said land, said land and port being off-set in non-coincidence a predetermined amount lengthwise along a sleeve encompassing said control valve for establishing the flow of fluid from the pressure source through said port to said one area of the pressure control valve exposed to the pressure distributed to said other side of the motor member and to said leak orifice.

14. A fluid pressure system including, a fluid motor having a movable member subject to an external force tending to move said member in one direction, a source of fluid pressure, a governor valve having a flow port connected to one side of the fluid motor, a pressure reducing valve connected to said source for reducing the pressure of fluid applied to the opposite side of the fluid motor, said governor valve being automatically operable to distribute pressure fluid from said source to said one motor side for opposing the reduced pressure applied to the opposite motor side, said reduced pressure acting in assisting relation to said external force, the construction and arrangement being such that the fluid motor will be held inactive, while said flow port is slightly open to said source, and pressure control means connected between said port and said source including a constant leak orifice connected to said governor valve flow port and operable only when pressure fluid flows through said flow port to the motor to maintain a continual flow of fluid to drain, and a valve for varying the quantity of flow to said leak orifice.

RICHARD E. MOORE.

References Cited in the file of this patent

UNITED STATES PATENTS

| Number | Name | Date |
|---|---|---|
| 1,972,462 | Schafer | Sept. 4, 1934 |
| 2,133,170 | Johnson | Oct. 11, 1938 |
| 2,167,328 | Beggs | July 25, 1939 |
| 2,338,483 | Beebe | Jan. 4, 1944 |
| 2,413,439 | Drake | Dec. 31, 1946 |